United States Patent [19]

Birsching

[11] Patent Number: 5,492,191
[45] Date of Patent: Feb. 20, 1996

[54] POWER STEERING GEAR FOR MOTOR VEHICLE

[75] Inventor: Joel E. Birsching, Unionville, Mich.

[73] Assignee: General Motors Corporation, Detroit, Mich.

[21] Appl. No.: 356,018

[22] Filed: Dec. 14, 1994

[51] Int. Cl.$^6$ ..................................................... B62D 5/22
[52] U.S. Cl. .......................... 180/79.1; 91/372; 91/375 A; 180/143; 180/DIG. 7; 180/DIG. 18
[58] Field of Search ................................. 180/132, 79.1, 180/141, 142, 143, 146, DIG. 7, DIG. 18, DIG. 19; 91/371, 372, 375 A

[56] References Cited

U.S. PATENT DOCUMENTS

| | | | |
|---|---|---|---|
| 3,406,773 | 10/1968 | Luther | 180/146 |
| 3,998,131 | 12/1976 | Adams | 91/372 |
| 4,034,825 | 7/1977 | Adams | 180/143 |
| 4,454,801 | 6/1984 | Spann | 91/375 A |
| 4,819,545 | 4/1989 | Dymond | 91/371 |
| 5,119,898 | 6/1992 | Eckhardt et al. | 180/142 |
| 5,230,273 | 7/1993 | Fraley, Jr. | 91/371 |

Primary Examiner—Mitchell J. Hill
Attorney, Agent, or Firm—Saul Schwartz

[57] ABSTRACT

A variable effort power steering gear including a control valve substantially as described in U.S. Pat. No. 4,454,801, an electromagnetic apparatus substantially as described in U.S. Pat. No. 5,119,898 for varying the effective centering force of a torsion bar of the control valve, and a support means for a tubular spool shaft of the steering gear relative to a pinion head of the steering gear which affords the spool shaft a degree of freedom relative to the pinion head perpendicular to a lateral centerline defined by a pair of radially oriented pins connecting a valve body of the control valve to the pinion head to prevent binding between the valve body and a valve spool on the spool shaft. In a preferred embodiment, the support means includes a cylindrical journal on the torsion bar and a bushing on the spool shaft at the inboard end thereof having an elongated bore therein around the cylindrical journal with a short dimension in the direction of the lateral centerline generally equal to the diameter of the cylindrical journal and a long dimension exceeding and perpendicular to the short dimension.

3 Claims, 3 Drawing Sheets

POWER STEERING GEAR FOR MOTOR VEHICLE

FIELD OF THE INVENTION

This invention relates to motor vehicle power steering gears.

BACKGROUND OF THE INVENTION

In motor vehicle power steering gears such as described in U.S. Pat. No. 4,454,801, issued Jun. 19, 1984 and assigned to the assignee of this invention, manual effort applied to an input or spool shaft of the gear is reacted to an output element or pinion head of the gear through a torsion bar which twists through an angle proportional to the applied effort. A control valve of the steering gear has a valve spool rotatable with the spool shaft and a valve body around the valve spool rotatable with the pinion head. Throttling orifices defined between the valve body and the valve spool open and close to regulate a steering assist boost pressure in accordance with the relative angular positions of the valve body and the valve spool corresponding to the angle through which applied manual effort twists the torsion bar. Close tolerance between the valve body and the valve spool minimizes fluid leakage around the throttling orifices. To minimize valve hysteresis attributable to rubbing or binding of the valve body against the valve spool due to minor runout or eccentricity of the valve spool relative to the pinion head, the valve body is connected to the pinion head through a simple universal joint consisting of a radially oriented spherical pin on the pinon head received in a cylindrical socket in the valve body.

U.S. Pat. No. 5,119,898, issued Jun. 9, 1992 and assigned to the assignee of this invention, describes a variable effort power steering gear having a control valve substantially as described in the aforesaid U.S. Pat. No. 4,454,801 and an electromagnetic apparatus for varying the centering force of the torsion bar. The electromagnetic apparatus includes a magnet ring connected to the spool shaft, a pole piece connected to the valve body at the opposite end thereof from the pinion head, and an exciting coil for inducing electromagnetic torque between the magnet ring and the pole piece. A second radially oriented pin on the pinion head diametrically opposite the aforesaid radially oriented pin is closely received in a slot in the valve body to minimize binding between the valve body and valve spool due to reaction of electromagnetic torque through the valve body. Because the second radially oriented pin limits the degrees of freedom between the valve body and pinion head afforded by the simple universal joint consisting of just the spherical pin and cylindrical socket, more precise and expensive manufacturing techniques are required to achieve acceptably low valve hysteresis.

SUMMARY OF THE INVENTION

This invention is a new and improved motor vehicle variable effort power steering gear including a control valve substantially as described in the aforesaid U.S. Pat. No. 4,454,801, an electromagnetic apparatus substantially as described in the aforesaid U.S. Pat. No. 5,119,898, and a support means for a tubular spool shaft of the steering gear relative to a pinion head of the steering gear which affords the spool shaft a degree of freedom relative to the pinion head perpendicular to a lateral centerline defined by a pair of radially oriented pins connecting a valve body of a control valve to the pinion head to prevent binding between the valve body and a valve spool on the spool shaft. In a preferred embodiment, the support means includes a cylindrical journal on a torsion bar of the control valve inside the stub shaft having opposite ends connected to the spool shaft and to the pinion head and a bushing on the spool shaft at the inboard end thereof having an elongated bore therein around the cylindrical journal with a short dimension in the direction of the lateral centerline generally equal to the diameter of the cylindrical journal and a long dimension perpendicular to the short dimension exceeding the short dimension so that the inboard end of the spool shaft has a degree of freedom relative to the pinion head perpendicular to the lateral centerline.

DESCRIPTION OF A PREFERRED EMBODIMENT

Figure 1:
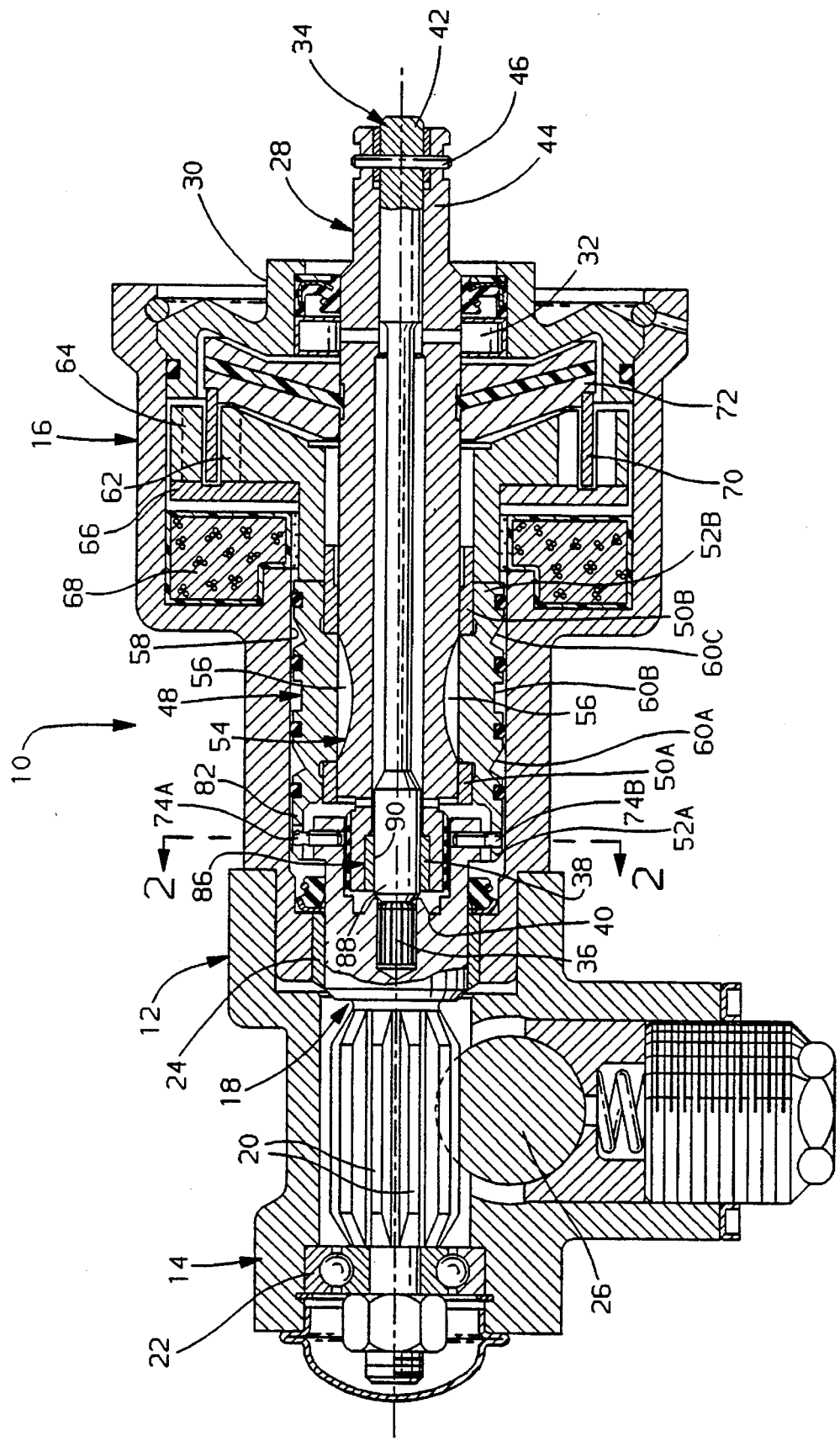
FIG. 1 is a longitudinal sectional view of a motor vehicle power steering gear according to this invention.

A variable effort motor vehicle power steering gear 10 according to this invention, similar to the variable effort power steering gear described in the aforesaid U.S. Pat. No. 5,119,898, includes a housing 12 consisting of a rack housing 14 and a valve housing 16. A pinion head 18 having a plurality of gear teeth 20 thereon is rotatably supported on the rack housing 14 by a roller bearing 22 and by a sleeve bearing 24. A rack bar 26 having a plurality of rack teeth meshing with the gear teeth 20 on the pinion head is supported on the rack housing 14 for bodily movement perpendicular to the pinion head in response to rotation of the latter. The ends of the rack bar, not shown, are connected to steerable wheels of the motor vehicle in conventional fashion.

A tubular spool shaft 28 of the steering gear protrudes into the valve housing 16 through a cover 30 on the valve housing and is rotatably supported on the cover by a bearing 32. A proportional control valve in the valve housing 16, similar to the valve described in the aforesaid U.S. Pat. No. 4,454,801, includes a torsion bar 34 inside the tubular spool shaft. An inboard end 36 of the torsion bar protrudes beyond a corresponding inboard end 38 of the spool shaft and is force fitted in a serrated bore at the bottom of a counterbore 40 in the pinion head 18. An outboard end 42 of the torsion bar is connected to the spool shaft 28 at an outboard end 44 of the latter by a pin 46. The outboard end 44 of the spool shaft is connected to a manual steering wheel, not shown, of the motor vehicle for rotation as a unit therewith. A lost motion connection in the counterbore 40, FIG. 2, permits about 7 degrees of twist of the torsion bar and corresponding relative angular movement between the pinion head and the spool shaft.

The proportional control valve further includes a tubular valve body 48 rotatably supported on the spool shaft by a pair of rings 50A–B press fitted in counterbores in respective ones of a pair of opposite ends 52A–B of the valve body and closely received around the spool shaft. A valve spool 54 of the proportional control valve is defined on the part of the spool shaft 28 between the ends 52A–B of the valve body and includes a plurality of arc-shaped slots 56 facing a plurality of internal grooves, not shown, in the valve body and cooperating therewith in defining a plurality of throttling orifices, not shown, which open and close in response to relative rotation between the valve body and the spool shaft.

The valve body 48 is disposed inside a cylindrical wall 58 of the valve housing 16 with clearance between the wall and the valve body illustrated in exaggerated fashion in the drawings. A plurality of outside annular grooves 60A–C on the valve body 48 are isolated from each other by seal rings on the valve body slidably engaging the cylindrical wall 58. The grooves 60A, 60C are connected to opposite working chambers, not shown, of a steering assist fluid motor. The groove 60B is connected to a pump, not shown. When the valve spool rotates relative to the valve body, the ones of the throttling orifices which are closing regulate a boost pressure in the corresponding one of the annular grooves 60A, 60C and in one chamber of the steering assist fluid motor. The ones of the throttling orifices which are opening facilitate unrestricted drainage of low pressure fluid from the other of the working chambers of the fluid motor.

An electromagnetic mechanism of the steering gear 10 includes an inner pole piece 62 and an outer pole piece 64 rigidly connected to the inner pole piece by a ring 66. The inner pole piece is rigidly connected to the ring 50B on the valve body whereby the pole pieces 62, 64 are rotatable as a unit with the valve body 48. An encapsulated annular exciting coil 68 is rigidly mounted on the valve housing 16 adjacent the pole pieces 62, 64.

The electromagnetic apparatus further includes a permanent magnet assembly consisting of a cylindrical magnet ring 70 between the inner and outer pole pieces 62, 64 and a retaining hub 72 rigidly attached to the magnet ring and to the spool shaft 28 so that the magnet ring is rotatable as a unit with the spool shaft. The magnet ring is made of sintered powdered metal which is exposed to a strong, externally created magnet field such that a plurality of radially oriented permanent magnets, not shown, are formed on the magnet ring. When the exciting coil is turned on, an electromagnetic torque reaction is induced between the valve body 48 and the spool shaft 28, the direction and magnitude of which depends on the direction and magnitude of the flow of direct current in the exciting coil.

A pair of radially oriented cylindrical pins 74A–B are rigidly attached to the pinion head 18 at diametrically opposite sides of the latter. Each of the pins 74A–B is aligned on a lateral centerline 76 of the pinion head and includes a generally spherical head 78. The spherical head 78 of the pin 74B fits closely in a radial bore 80 in an annular lip 82 of the valve body at the annular end 52A thereof. The spherical head 78 of the pin 74A fits closely between the sides of a slot 84 in the annular lip 82 diametrically opposite the radial bore 80 and open through the end 52A of the valve body.

Figure 2:
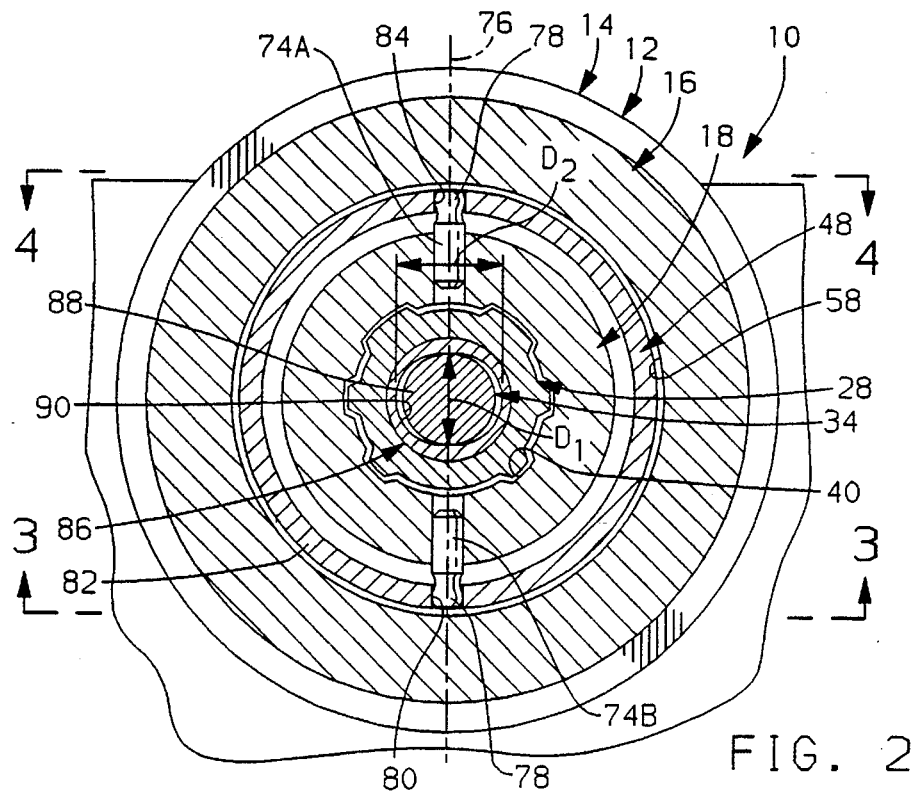
FIG. 2 is a sectional view taken generally along the plane indicated by lines 2—2 in FIG. 1.
Figure 3:
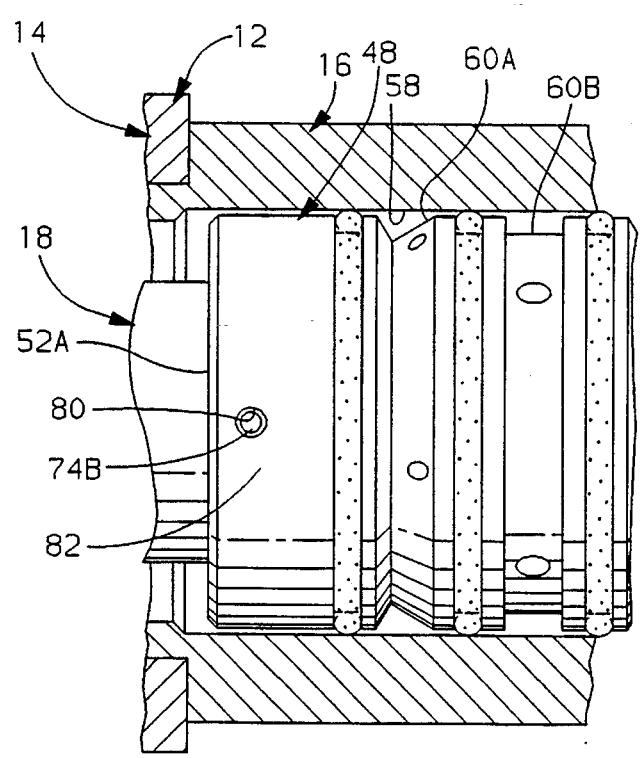
FIG. 3 is a fragmentary sectional view taken generally along the plane indicated by lines 3—3 in FIG. 2.
Figure 4:
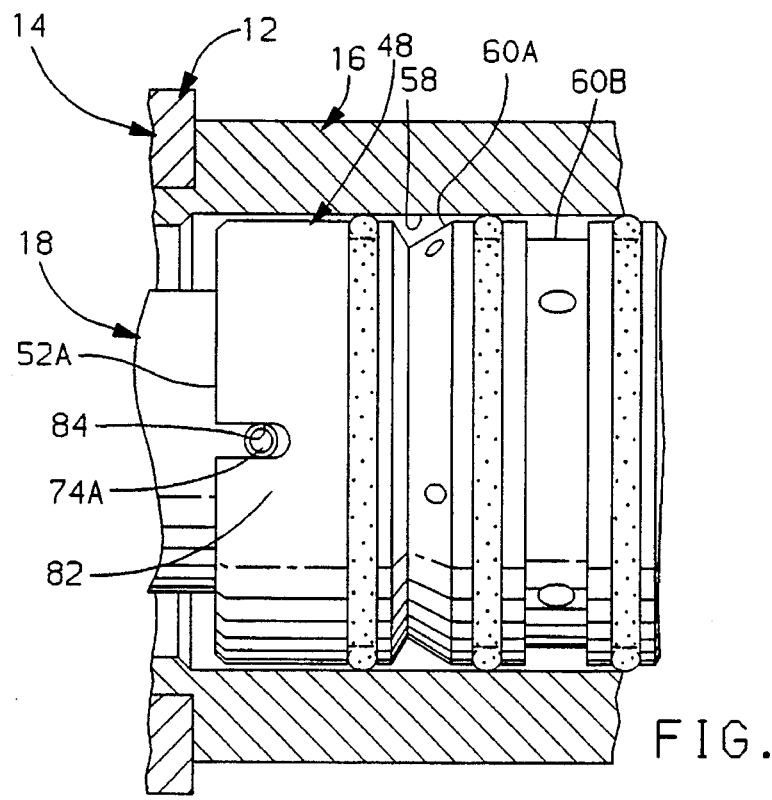
FIG. 4 is a fragmentary sectional view taken generally along the plane indicated by lines 4—4 in FIG. 2.

As seen best in FIG. 2, a bushing 86 is seated in a counter bore in the inboard end 38 of the spool shaft around a cylindrical journal 88 on the torsion bar. The bushing has an elongated bore 90 therein around the cylindrical journal 88 with a short dimension $D_1$ parallel to the lateral centerline 76 and a greater, long dimension $D_2$ perpendicular to the short dimension. The short dimension corresponds generally to the diameter of the cylindrical journal 88 so that the bushing closely rotatably supports the inboard end of the spool shaft 28 on the torsion bar. The long dimension $D_2$ affords clearance on opposite sides of the cylindrical journal 88 between the latter and the ends of the elongated bore 90 so that the inboard end of the spool shaft is shiftable relative to the torsion bar from a center position, FIG. 2, in opposite directions perpendicular to the lateral centerline 76 until the ends of the elongated bore 90 engage the cylindrical journal 88.

The torsion bar defines an open-center position of the valve spool relative to the valve body in which all of the throttling orifices are equally open and fluid circulates freely from the groove 60B to a drain, not shown, connected to a reservoir. When a driver turns the manual steering wheel, the spool shaft 28 rotates relative to the pinion head 18 against a centering force induced by the twist of the torsion bar 34. The valve body 48 is held stationary relative to the spool shaft by the radially oriented pins 74A–B so that the valve spool 54 rotates relative to the valve body to close appropriate ones of the throttling orifices for regulating a steering assist boost pressure.

At the same time, electromagnetic torque between the magnet ring 70 and the pole pieces 62, 64 induced by electric current in the exciting coil 68 is reacted to the spool shaft 28 through the retaining hub 72 and to the pinion head 18 through the pole piece 62, the ring 50B on the valve body, the valve body itself, and the radially oriented pins 74A–B. Depending upon the direction of current flow in the exciting coil, the induced electromagnetic torque increases or decreases the effective centering force of the torsion bar to vary the proportionality of the control valve.

The inboard end 38 of the spool shaft is closely constrained against movement relative to the pinion head 18 parallel to the lateral centerline 76 by the elongated bore 90 of the bushing 86 across the short dimension $D_1$ thereof. The valve body 48, however, is unrestrained parallel to the lateral centerline 76 because of clearance radially outboard of the pins 74A–B. Therefore, during relative rotation between the valve body and the pinion head., the valve body 48 is free to move or "float" in the direction of the lateral centerline 76 relative to the pinion head to prevent binding of the valve body against the spool shaft in the event that there is radial runout or eccentricity between the spool shaft and the pinion head attributable to manufacturing tolerances.

The diameters of the spherical heads 78 of the radially oriented pins 74A–B correspond closely to the diameter of the radial bore 80 and to the width of the slot 84 between the parallel sides thereof so that the connection between the valve body and the pinion head is substantially free or devoid of angular lash. The closeness of the fit of the radially oriented pins 74A–B in the bore 80 and in the slot 84 effectively forecloses freedom of movement or "float" of the valve body 48 perpendicular to the lateral centerline 76. The inboard end 38 of the spool shaft 28, however, is unrestrained perpendicular to the lateral centerline 76 due to the elongation of the bore 90 in the bushing 86. Therefore, during relative rotation between the valve body and the pinion head, the valve body 48 and the inboard end 38 of the spool shaft are both free to move or "float" perpendicular to the lateral centerline 76 relative to the pinion head to prevent binding of the valve body against the spool shaft in the event that there is radial runout or eccentricity between the spool shaft and the pinion head attributable to manufacturing tolerances.

Figure 5:
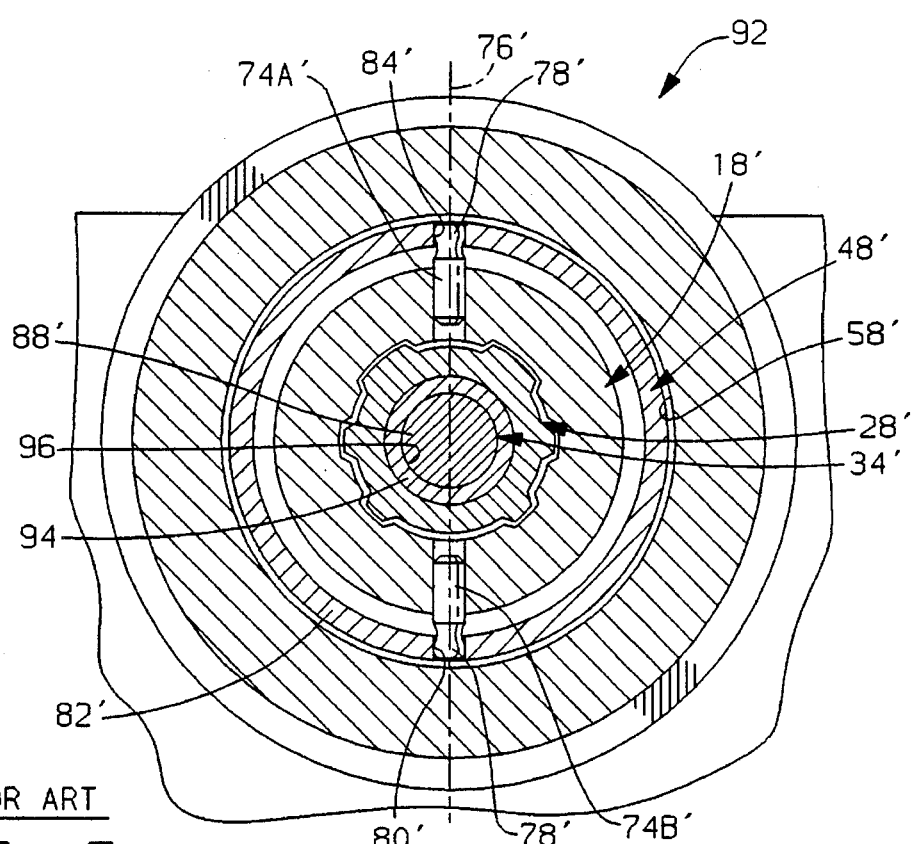
FIG. 5 is similar to FIG. 2 but showing a prior motor vehicle power steering gear.

The steering gear 10 according to this invention is contrasted with a steering gear 92, FIG. 5, such as described in the aforesaid U.S. Pat. No. 5,119,898 as follows. Referring to FIG. 5, wherein elements common to both of the steering gears 10 and 92 are identified by primed reference characters, the prior steering gear 92 has a pair of radially oriented cylindrical pins 74A'–B' rigidly attached to a pinion head 18' at diametrically opposite sides of the latter. Each of the pins 74A'–B' is aligned on a lateral centerline 76' of the pinion head and includes a generally spherical head 78'. The spherical head 78' of the pin 74B' fits closely in a radial bore 80' in an annular lip 82' of a valve body 48'. The spherical head 78' of the pin 74A' fits closely between the sides of an open slot. 84' in the annular lip 82' diametrically opposite the radial bore 80'.

A bushing 94 seats in a counter bore in an inboard end of a spool shaft 28' around a cylindrical journal 88' on a torsion bar 34'. The bushing 94 has a cylindrical bore 96 which closely receives the cylindrical journal 88' on the torsion bar so that the inboard end of the spool shaft 28' is constrained against bodily movement relative to the torsion bar 34' and the pinion head 18' in the direction of and perpendicular to the lateral centerline 76'.

The inboard end of the spool shaft 28' is constrained against movement relative to the pinion head 18' parallel to the lateral centerline 76' by the bore 96 of the bushing 94. The valve body 48', however, is unrestrained in the direction of the lateral centerline 76' because of clearance radially outboard of the pins 74A'–B'. Therefore, during relative rotation between the valve body and the pinion head, the valve body 48' is free to move or "float" parallel to the lateral centerline relative to the pinion head to prevent binding of the valve body against the spool shaft in the event that there is radial runout or eccentricity between the spool shaft and the pinion head attributable to manufacturing tolerances.

The diameters of the spherical heads 78' of the radially oriented pins 74A'–B' correspond closely to the diameter of the radial bore 80' and to the width of the slot 84' between the parallel sides thereof so that the connection between the valve body 48' and the pinion head 18 is substantially free or devoid of angular lash. The closeness of the fit of the spherical heads of the radially oriented pins 74A'–B' in the bore 80' and in the slot 84' effectively forecloses freedom of movement or "float" of the valve body 48' perpendicular to the lateral centerline 76'. Contrary to the steering gear 10 according to this invention, the inboard end of the spool shaft 28' of the prior steering gear 92 is also constrained against movement or "float" perpendicular to the lateral centerline 76'. Therefore, the valve body may bind or be forced against the valve spool during relative rotation therebetween in the event that there is radial runout or eccentricity between the spool shaft and the pinion head attributable to manufacturing tolerances.

The embodiments of the invention in which an exclusive property or privilege is claimed are defined as follows:

1. A motor vehicle power steering gear comprising:

a housing, a pinion head rotatably supported on said housing, a tubular spool shaft rotatably supported on said housing having an inboard end adjacent said pinion head, a torsion bar inside said spool shaft having an inboard end rigidly connected to said pinion head and an outboard end rigidly connected to said spool shaft operative to induce a centering force between said pinion head and said spool shaft in response to relative rotation therebetween, a tubular valve body rotatably supported on said spool shaft around a valve spool defined on said spool shaft, a first radially oriented pin on said pinion head aligned on a lateral centerline thereof, a second radially oriented pin on said pinion head aligned on said lateral centerline thereof diametrically opposite said first radially oriented pin, a radial bore in said valve body adjacent a first end thereof closely receiving said first radial pin on said pinion head, a radial slot in said valve body open through said first end thereof having a pair of parallel sides closely receiving therebetween said second radial pin whereby said valve body is connected to said pinion head for rotation as unit therewith and for bodily movement relative thereto parallel to said lateral centerline, a variable effort means connected to said spool shaft and to said valve body at a second end thereof opposite said first end selectively operable to induce a torque reaction between said spool shaft and said pinion head through said valve body for varying the effective centering force of said torsion bar, a cylindrical journal on said torsion bar, and a bushing on said spool shaft at said inboard end thereof including an elongated bore therein around said cylindrical journal on said torsion bar having a short dimension parallel to said lateral centerline generally equal to the diameter of said cylindrical journal so that said inboard end of said torsion bar is rotatably supported on said torsion bar and constrained against movement relative to said pinion head parallel to said lateral centerline and a long dimension perpendicular to said short dimension exceeding the diameter of said cylindrical journal so that said inboard end of said spool shaft is moveable relative to said pinion head perpendicular to said lateral centerline.

2. The motor vehicle power steering gear recited in claim 1 wherein said variable effort means connected to said spool shaft and to said valve body at said second end thereof includes:

a magnet ring connected to said spool shaft for rotation as a unit therewith, a pole piece connected to said valve body at said second end thereof, and an exciting coil on said housing operative to induce an electromagnetic torque between said magnet ring and said pole piece when an electric current flows through said exciting coil.

3. The motor vehicle power steering gear recited in claim 2 further comprising:

a spherical head on said first pin having an outside diameter substantially equal to a diameter of said radial bore in said valve body, and a spherical head on said second pin having an outside diameter substantially equal to the spacing between said sides of said radial slot in said valve body.

* * * * *